Patented Feb. 4, 1941

2,230,538

UNITED STATES PATENT OFFICE 2,230,538

PROCESS OF SEPARATING VANADIUM FROM TITANIUM

Leslie G. Jenness, Englewood, and Roger L. Annis, Newark, N. J., assignors, by mesne assignments, to Vanadium Corporation of America, New York, N. Y., a corporation of Delaware No Drawing. Application March 20, 1940, Serial No. 325,068

9 Claims. (Cl. 23—87)

This invention relates to the separation of vanadium from titanium, and more particularly to a process in which compounds of vanadium are formed which are readily separable from titanium tetrachloride.

Commercially available titanium compounds almost invariably contain small quantities of vanadium compounds. Titanium ores, in general, contain vanadium. No commercially practicable method for separating vanadium compounds from titanium compounds has heretofore been known. Vanadium-free titanium compounds have many useful applications in the arts, but the commercial titanium compounds, as well as the titanium ores referred to, could not be employed for the commercial preparation of vanadium-free titanium compounds.

The present invention, however, provides a simple economical method of making this separation.

Titanium compounds or the titanium content of ores can, in general, be easily converted into titanium tetrachloride, which is a volatile liquid at ordinary temperatures and pressures, by treating the titanium compounds with chlorine or chlorine in the presence of sulfur higher chlorides, the sulfur chlorides functioning as reducing agents. Vanadium contained in titanium compounds or ores appears in solution in the resulting titanium tetrachloride even though the titanium tetrachloride be distilled from the reaction zone in which it is formed. The vanadium is believed to be present in the form of vanadium oxychloride or vanadium tetrachloride, both of which are volatile liquids at ordinary temperatures and pressures. However, the exact form of the vanadium in solution in the titanium tetrachloride is not material to the present invention. Repeated fractional distillation or other known methods of separation are ineffective to remove the vanadium from the titanium tetrachloride.

It has been discovered that the addition of small amounts of certain organic materials causes the formation of vanadium compounds which are solid, insoluble in the titanium tetrachloride, and non-volatile at or considerably above the boiling point of titanium tetrachloride. These compounds can therefore, be separated from the titanium tetrachloride by distilling the titanium tetrachloride from the compounds, or by such mechanical methods as filtering or centrifuging. Thus, vanadium-free titanium tetrachloride is produced which may be easily converted into other titanium compounds, for example, a pure white titanium oxide suitable for pigments. It has, heretofore, been commercially impracticable to produce such white titanium oxide from vanadium-contaminated titanium ores or compounds, since the vanadium content rendered the titanium oxide brown in color.

In accordance with the present invention, it has been found that the organic compounds referred to polymerize when added to a mixture of titanium tetrachloride containing vanadium, and react with the vanadium during polymerization to form compounds which are easily separable from the titanium tetrachloride, leaving vanadium-free titanium tetrachloride. Other organic compounds either do not react in the titanium tetrachloride-vanadium solution or react with the titanium tetrachloride without reacting with the vanadium. The present invention is concerned with organic materials which polymerize in the presence of titanium tetrachloride containing vanadium while reacting with the vanadium to form compounds readily separable from the titanium tetrachloride.

It is, therefore, an object of the present invention to provide a simple and economical process of removing vanadium from titanium compounds.

Another object of the present invention is to provide a process of removing vanadium from titanium compounds in which a material is added to titanium tetrachloride containing vanadium to form a compound with the vanadium which can be easily separated from the titanium tetrachloride.

A further object of the invention is to provide a process of removing vanadium from titanium tetrachloride containing vanadium in which an organic material is added to the mixture to form a non-volatile compound with the vanadium from which the titanium tetrachloride can be distilled.

Ordinary rubber is an example of an organic material which, when added to titanium tetrachloride containing vanadium, will react with the vanadium to form a solid compound which is non-volatile at the boiling point of the titanium tetrachloride. Rubber is already partly polymerized, but further polymerization takes place producing a black, brittle solid, usaully granular or in the form of a powder. The resultant rubber-vanadium compound may be separated from the titanium tetrachloride either by distilling the titanium tetrachloride from the resultant mixture or filtering or centrifuging the rubber-vanadium compound from the titanium tetrachloride. For example, vanadium-free titanium tetrachloride may be distilled from the rubber-vanadium compound at a temperature of 136° C., which is the boiling point of titanium tetrachloride. By condensing the titanium tetrachloride vapors, a water white liquid titanium tetrachloride is produced which shows no traces of vanadium by the best analytical methods available.

Other organic compounds or materials containing organic compounds which polymerize in the presence of titanium tetrachloride containing vanadium have been found effective to provide for the removal of vanadium from titanium tetrachloride. The following table lists a series of materials which are effective.

Table I

| Substance | Percent added | Percent V originally present | Percent V in distilled titanium |
|---|---|---|---|
| Rubber (pure smoke sheet) | .25 | .070 | .000 |
| Rubber (acid cured) | .25 | .070 | .000 |
| Rubber (vulcanized) | .50 | .070 | .004 |
| Balata (resin free) | .25 | .070 | .000 |
| Art gum | .25 | .070 | .000 |
| Polymerized sulfonated oil | .50 | .070 | .000 |
| Soy bean oil | .50 | .070 | .000 |
| Cottonseed stearine (IV 3.67) | .50 | .070 | .000 |
| Russian mineral oil (trade name "Volga Oil") | 2.0 | .070 | .000 |
| Russian mineral oil (trade name "Volga Oil") | .6 | .070 | .009 |

In securing the data for the above table, the materials were added in the proportions given to titanium tetrachloride which contained 0.070% vanadium, and the resultant mixture refluxed for one hour at the boiling point of titanium tetrachloride, after which titanium tetrachloride was distilled from the mixture and condensed. It will be noted that pure smoke sheet rubber, acid cured rubber, and resin-free balata, in amounts equal to 0.25% of the vanadium-titanium tetrachloride mixture was effective to completely prevent the vaporization of vanadium compounds. However, 0.50% vulcanized rubber did not completely prevent the vaporization of vanadium compounds, as shown by the fact that 0.004% vanadium was found in the distillate. This indicates that there is an actual compound formed between the vanadium and the rubber, since the presence of sulfur in combination with the rubber due to vulcanization evidently reduced the effectiveness of the rubber. These results also indicate that the rubber is the active ingredient, since resin-free balata also was effective to produce vanadium-free titanium tetrachloride.

It was also found that art gum, which is understood to be primarily polymerized sulfonated oil, was effective to produce vanadium-free titanium tetrachloride when added in an amount equal to 0.25%. To check this result, a quantity of polymerized sulfonated oil was tried, and, as shown by the table, was also effective to produce vanadium-free titanium tetrachloride. These materials also polymerized to a black brittle solid or a black powder during the reaction. Since the polymerized sulfonated oil is derived from glyceride oils, soya bean oil was tried and was also found effective. It was noted, however, that the soya bean oil first formed an orange-colored, rubbery mass, which indicated polymerization, before becoming dispersed in the titanium tetrachloride containing vanadium and then further polymerizing to a solid similar to the materials discussed above. Soya bean oil contains large amounts of unsaturated fatty acid radicals, and to determine the effect of unsaturation, a quantity of cottonseed stearine having an iodine number of only 3.67 was employed, and was found to be effective, indicating that unsaturated glycerides were not essential. This material also formed a rubbery mass prior to dispersion in the solution and further polymerization. It is believed that the titanium tetrachloride first reacts with the unpolymerized organic material while causing polymerization and forms compounds in which the vanadium replaces the titanium during further polymerization.

A material containing saturated cyclic compounds was then employed. Such a material was found in Russian mineral oil, sold under the trade name "Volga Oil," which is a highly refined petroleum product containing large amounts of naphthenic compounds such as cyclic hexane and its derivatives. As shown by the table, this material was also effective in amounts equal to 2% of the titanium-vanadium solution and also rendered the majority of the vanadium non-volatile when only 0.6% of the compound was employed. This material also produced a black solid polymer.

Other carbon compounds which do not react with and are not polymerizable by titanium tetrachloride or vanadium compounds, as well as carbon itself, were then tried, and, as shown by the following table, were not effective.

Table II

| Substance | Percent added | Percent V originally present | Percent V in distilled titanium |
|---|---|---|---|
| Paraffin | 2.0 | .070 | .070 |
| Sugar (sucrose) | 2.0 | .070 | .071 |
| Wood | 2.0 | .070 | .068 |
| Activated carbon | 2.0 | .070 | .072 |

Of the above compounds, paraffin is a mixture of saturated straight chain hydrocarbons, sugar is a saturated straight chain hydrocarbon containing hydroxyl groups, wood is essentially cellulose, and carbon is the element which is common to the various compounds. It is obvious that none of these substances allow the formation of an addition or substitution compound with titanium or vanadium.

Certain other cyclic compounds, and compounds which it was believed might polymerize in the presence of the titanium tetrachloride-vanadium solution were then tried. For example, benzaldehyde, which is a cyclic compound having an aldehyde radical attached thereto, reacted with the titanium tetrachloride and was precipitated from the solution. Glycerine and ethyl alcohol, both of which are straight chain compounds containing alcohol radicals, also reacted with the titanium tetrachloride, and precipitated from the solution. Thus, none of these compounds were effective to combine with the vanadium, such that vanadium-free titanium tetrachloride could be separated therefrom.

Since acetylene, which is a highly unsaturated straight chain compound, is known to polymerize into a rubber-like body, it was bubbled through a titanium tetrachloride-vanadium solution containing 0.07% vanadium. At low temperatures, i. e. below 50° C. or 60° C., a white deliquescent solid sublimed from the solution, which solid was apparently an addition product of titanium tetrachloride and acetylene. Upon raising the temperature, the quantity of this sublimate decreased and the formation of a polymerized product was observed at approximately 50° C. to 60° C. At 100° C. sublimation ceased and the acetylene was entirely polymerized into a rubber-like product. This product dispersed in the solution and further polymerized during reaction with the vanadium and enabled vanadium-free titanium tetrachloride to be distilled from the solution.

The above described experiments indicate that the removal of vanadium is dependent upon the presence of a material which readily forms addition or substitution products with vanadium in titanium tetrachloride. All of the compounds effective for this purpose, thus far found, polymerize in the presence of the titanium tetrachloride containing vanadium. It also appears that titanium tetrachloride is a good polymerizing agent. The action during polymerization appears to first consist of forming an addition product with titanium tetrachloride, followed by a reaction between the resultant product and vanadium, with the liberation of titanium tetrachloride and the formation of a finally polymerized product.

The above reactions between titanium tetrachloride and vanadium can be separately performed. Adding any of the materials listed in Table I as well as acetylene directly to vanadium oxychloride in the absence of titanium produces polymerization but at an extremely low rate. Adding these materials to titanium tetrachloride in the absence of vanadium apparently causes a reaction with titanium tetrachloride to take place. This is clearly apparent with the materials which are originally unpolymerized. For example, soya bean oil rapidly polymerizes in the titanium tetrachloride into an orange-colored rubbery material, containing titanium and resembling art gum. The other unpolymerized substances such as cottonseed stearine and Russian mineral oil and acetylene also rapidly form such gummy substances. Titanium tetrachloride also appears to react with the materials such as rubber and polymerized sulphonated oil, which are already at least partly polymerized. Upon removal from the titanium tetrachloride they likewise contain titanium. All of the products resulting from treatment with titanium tetrachloride when added to vanadium oxychloride immediately further polymerize to a black brittle solid, usually in the form of a powder, and combine with vanadium while liberating titanium.

Both reactions rapidly take place in titanium tetrachloride containing vanadium. If sufficient vanadium is present to complete the reaction, the polymer is inert to further reaction with vanadium. Vanadium can be quantitatively recovered from the resulting polymer.

The polymer also contains chlorine, the atomic ratio of vanadium to chlorine being 1:2. Heating the polymer in an atmosphere of inert gas at a temperature as high as 138° C. does not cause any volatilization of vanadium or separation of chlorine. Heating in the presence of air at a temperature of 36 to 40° C. causes volatilization of all of the chlorine and two-thirds of the vanadium as $VOCl_3$. If chlorine is added to the atmosphere of air, all of the vanadium is volatilized as $VOCl_3$. Removal of the vanadium does not materially change the appearance of the polymer and still leaves it inert to further reaction with vanadium. If insufficient vanadium were originally present to complete the reaction, the partly reacted polymer, either before or after removal of vanadium, can be reused for vanadium removal until its affinity for vanadium is completely satisfied.

It is apparent that there are a large number of organic compounds capable of being employed as vanadium removing agents. The common property of these compounds appears to be that they polymerize in titanium tetrachloride containing vanadium while combining with vanadium.

It has been found that the extent of removal is dependent upon time, temperature and percent of reagent employed. This is shown by the following table, when balata was used as the vanadium removal agent.

| Percent balata | Time | Temperature, °C. | Percent V original | Percent V left |
|---|---|---|---|---|
| 0.10 | 1 hr | 136 | .070 | .018 |
| 0.25 | 1 hr | 136 | .070 | .000 |
| 0.50 | 15 min | 136 | .070 | .000 |
| 0.50 | 16 hrs | 20 | .070 | .070 |

When only 0.10% balata was employed, refluxing for one hour at a temperature of 136° C. followed by distillation of titanium tetrachloride did not entirely eliminate vanadium from the titanium tetrachloride. However, 0.25% balata produced a vanadium-free titanium tetrachloride. Also, 0.50% balata produced vanadium-free titanium tetrachloride after only fifteen minutes' refluxing at a temperature of 136° C., while the same amount of balata in contact for sixteen hours at a temperature of 20° C. did not even reduce the amount of vanadium present in the titanium tetrachloride subsequently distilled. This table is not intended to show that 136° C. is essential with all vanadium-removing agents, as the necessary temperature will depend upon the agent employed and may be either higher or lower than the temperature for balata, but is merely intended to show that the reaction is more rapid at elevated temperatures and that the temperature must be sufficiently high and the time of reaction sufficiently long to cause a relatively stable compound to be formed with the vanadium content.

Thus the present invention provides a simple and economical method of removing vanadium from titanium compounds. Commercial titanium compounds, as well as titanium ores containing vanadium, can be converted into titanium tetrachloride containing vanadium by known processes. The resulting mixture may then be treated as above described, to produce vanadium-free titanium tetrachloride and then, if desired, converted into the original or other compounds. Furthermore, the vanadium can be separately recovered from the material separated from the titanium tetrachloride as substantially pure vanadium oxychloride which can likewise be converted into any desired vanadium compound.

This application is a continuation in part of copending application Serial No. 191,834, filed February 21, 1938.

While we have disclosed the preferred embodiments of our invention, it is to be understood that the invention is not limited to the details disclosed, but may be varied within the scope of the following claims.

We claim:
1. The process of removing vanadium from titanium compounds, which comprises, adding to titanium tetrachloride containing vanadium, an organic compound which will polymerize in said titanium tetrachloride in the presence of vanadium to form a polymer separable from said titanium tetrachloride and containing said vanadium, causing said compound to form said polymer containing said vanadium, and separating said polymer containing said vanadium from said titanium tetrachloride.

2. The process of separating vanadium from a titanium compound containing vanadium, which comprises, converting said compound into titanium tetrachloride containing vanadium, adding thereto an organic compound which will polymerize in said titanium tetrachloride in the presence of vanadium while reacting with said vanadium to form a polymer which is non-volatile at the boiling point of said titanium tetrachloride, causing said compound to form said polymer containing said vanadium, and distilling said titanium tetrachloride from said polymer.

3. The process of separating vanadium from titanium tetrachloride containing vanadium, which comprises, adding thereto an organic material which will polymerize in said titanium tetrachloride in the presence of vanadium while reacting with said vanadium to form a solid non-volatile polymer containing said vanadium, said organic material being added in sufficient amount to combine with substantially all of said vanadium, heating the resulting mixture to a temperature sufficient to cause said material to polymerize and react with said vanadium, and separating said polymer containing said vanadium from said titanium tetrachloride.

4. The process of separating vanadium from titanium tetrachloride containing vanadium which comprises adding thereto an organic material which will polymerize in said titanium tetrachloride in the presence of vanadium to form a solid non-volatile polymer containing said vanadium, subjecting the resulting mixture to a temperature sufficient to cause said material to polymerize and combine with vanadium, and separating said polymer containing said vanadium from said titanium tetrachloride.

5. The process of separating vanadium from titanium tetrachloride containing vanadium, which comprises, adding thereto an organic material which will polymerize in titanium tetrachloride while reacting with titanium and then further polymerize in the presence of vanadium while reacting with said vanadium to form a polymer containing said vanadium and separable from said titanium tetrachloride, and separating said polymer containing said vanadium from said titanium tetrachloride.

6. The process of separating vanadium from titanium tetrachloride containing vanadium, which comprises, adding rubber to said titanium tetrachloride containing vanadium, reacting said rubber with said vanadium at a temperature sufficient to cause said rubber to polymerize into a polymer containing vanadium, and separating said polymer from said titanium tetrachloride.

7. The process of separating vanadium from titanium tetrachloride containing vanadium, which comprises, adding a glyceride oil or fat to said titanium tetrachloride containing vanadium, reacting said glyceride oil or fat with said vanadium at a temperature sufficient to cause said glyceride oil or fat to polymerize into a polymer containing vanadium, and separating said polymer from said titanium tetrachloride.

8. The process of separating vanadium from titanium tetrachloride containing vanadium, which comprises, adding soya bean oil to said titanium tetrachloride containing vanadium, reacting said soya bean oil with said vanadium at a temperature sufficient to cause said soya bean oil to polymerize into a polymer containing vanadium, and separating said polymer from said titanium tetrachloride.

9. The process of separating vanadium from titanium tetrachloride containing vanadium, which comprises, adding an organic material containing naphthenic compounds to said titanium tetrachloride containing vanadium, reacting said organic material containing naphthenic compounds with said vanadium at a temperature sufficient to cause said organic material containing naphthenic compounds to polymerize into a polymer containing vanadium, and separating said polymer from said titanium tetrachloride.

LESLIE G. JENNESS.
ROGER L. ANNIS.